United States Patent Office
3,467,636
Patented Sept. 16, 1969

3,467,636
REDOX CATALYST SYSTEM FOR PREPARING
VINYLIDENE FLUORIDE INTERPOLYMERS
Arthur Nersasian, Wilmington, Del., assignor to E. I.
du Pont de Nemours and Company, Wilmington, Del.,
a corporation of Delaware
No Drawing. Continuation-in-part of application Ser. No.
618,347, Feb. 24, 1967. This application Nov. 15, 1967,
Ser. No. 683,126
Int. Cl. C08f 1/06, 15/40, 15/06
U.S. Cl. 260—80.77
5 Claims

ABSTRACT OF THE DISCLOSURE

The preparation of vinylidene fluoride interpolymers (e.g., with hexafluoropropene and tetrafluoroethylene) in aqueous medium with a peroxy compound like ammonium persulfate and a second component like NaI, NaBr, NaOCl or NaOBr, or $I_2$, $Br_2$ or $Cl_2$ in water. Exceptionally low Mooney viscosity polymers (e.g., ML–10/212° F. of as low as 7) can be prepared which cure to high-quality vulcanizates.

CROSS REFERENCE TO RELATED APPLICATION

This application is a continuation-in-part of applicant's copending application Ser. No. 618,347, filed Feb. 24, 1967 and now abandoned.

BACKGROUND OF THE INVENTION

Field of the invention

This invention relates to vinylidene fluoride interpolymers and, more particularly, their preparation using a particular catalyst system.

Description of the prior art

Polymers of vinylidene fluoride, such as vinylidene fluoride/hexafluoropropene copolymers (see Rexford, U.S. Patent 3,051,677) and vinylidene fluoride/hexafluoropropene/tetrafluoroethylene terpolymers (see Pailthorp and Schroeder, U.S. Patent 2,968,649) are known in the art to be elastomers which exhibit excellent heat and chemical resistance. Moreover, their curability provides for the manufacture of vulcanizates having outstanding properties.

Many of these vinylidene fluoride interpolymers typically exhibit Mooney viscosities (ML–10/212° F.) of 60 or 70 which indicate the polymer to be rather stiff and somewhat difficult to process. For some time, it has been desired to prepare vinylidene fluoride interpolymers which have excellent vulcanizate properties, but which have a lower Mooney viscosity in the uncured state making them much easier to process.

Typically, vinylidene fluoride interpolymers are prepared using an ammonium persulfate-sodium bisulfite polymerization catalyst (see Dittman et al. U.S. Patent 2,689,241). It is known that higher amounts of catalysts and higher polymerization temperatures will lead to a reduced Mooney viscosity; however, it has been rather difficult to get satisfactory polymers having a Mooney viscosity below about 50. It is also known that modifiers such as telomers or transfer agents can be employed to give very low Mooney viscosities in vinylidene fluoride polymers; however, such polymers by themselves have often been found to possess rather poor properties in the cured state and tend to stick to the processing equipment in the uncured state. For this reason, they are usually blended with high Mooney polymers to improve the processability of the latter.

SUMMARY OF THE INVENTION

It has unexpectedly been found that vinylidene fluoride interpolymers having surprising low Mooney viscosities, which, however, are curable to vulcanizates of high quality, can be prepared by polymerization in an aqueous medium containing (a) water-soluble peroxy catalyst compounds capable of initiating polymerization of the monomers in the system, and (b) a water-soluble iodide, bromide, hypochlorite or hypobromite, or aqueous solutions of iodine, bromine or chlorine.

DESCRIPTION OF PREFERRED EMBODIMENTS

This invention is applicable to the preparation of interpolymers of vinylidene fluoride ($VF_2$) with other fluorine-containing ethylenically unsaturated monomers copolymerizable therewith. Typical of the latter are hexafluoropropene (HFP), tetrafluoroethylene (TFE), perfluoroalkyl perfluorovinyl ethers [particularly where the alkyl radical contains from 1 to about 4 carbon atoms such as perfluoro(methyl vinyl)ether and perfluoro(propyl vinyl)ether], trifluorochloroethylene, and pentafluoropropylene. Of particular interest are the vinylidene fluoride/hexafluoropropene copolymers containing from about 70 to about 30 weight percent vinylidene fluoride and about 30 to about 70 weight percent hexafluoropropene (see Rexford U.S. Patent 3,051,677). Other important polymers are the terpolymers of vinylidene fluoride/hexafluoropropene/tetrafluoroethylene where in the monomer units are present in the following mole ratios: about 3 to 35 (preferably 15 to 25) weight percent tetrafluoroethylene units and about 97 to 65 (preferably 85 to 75) weight percent vinylidene fluoride and hexafluoropropene units, the latter two being present in a weight ratio of from 2.33/1 to 0.677/1 (see Pailthrop and Schroeder U.S. Patent 2,698,-649).

Other vinylidene fluoride polymers and their preparation are disclosed in Dittman et al. U.S. Patents 2,738,343 and 2,752,331, Hanford and Roland U.S. Patent 2,468,-664, Brubaker U.S. Patent 2,393,967, and Honn et al. U.S. Patents 2,833,752 and 2,965,619.

One component of the catalyst system must be the water-soluble peroxy catalyst compound capable of initiating polymerization of the monomers in the system. One or mixtures of more than one of such compounds may be present. All water-soluble persulfates, especially ammoniated persulfates, are suitable. Compounds which exhibit low activity in initiating polymerization of the monomers in the system employed are much less preferred, for example, sodium perborate, sodium peroxide, and hydrogen peroxide.

The second component of the catalyst system is a water-soluble iodide, bromide, hypochlorite or hypobromite, such as sodium, potassium, or ammonium iodides or bromides, sodium hypochlorite, sodium hypobromite, or an aqueous solution of elemental iodine, bromine or chlorine. While one or mixtures of more than one of such ingredients can be present as the second component, other conventional reducing agents, such as sodium bisulfite, are to be excluded.

When using the catalyst components of the prior art, such as ammonium persulfate and sodium bisulfite, in general, the ammonium persulfate is used in substantial excess. Further, the lower the ratio of ammonium persulfate to sodium bisulfite, the higher the Mooney viscosity of the polymer obtained. In this invention, an excess of peroxy compounds must be used over the amount of second component (hereinafter referred to simply as sodium iodide for the sake of convenience). However, it is unexpected that increasing amounts of sodium iodide cause the Mooney viscosity of the polymer obtained to decrease.

As a practical matter, the mole ratio of peroxy compound to sodium iodide in this invention must be at least about 1.2:1; however, there must be at least one mole of sodium iodide per 70 moles of peroxy compound. Preferably, the mole ratio of peroxy compound to sodium iodide will range from about 3:1 to 20:1 to obtain the vinylidene fluoride interpolymers of suitably low Mooney viscosity.

A wide range of catalyst system concentrations will polymerize the monomers; however, to obtain a Mooney viscosity below about 50 to about 105° C. polymerization temperature, one should employ at least one part of the catalyst system per about 150 parts of monomer.

As previously stated, the polymerization is carried out in an aqueous system. The weight ratio of water to monomer can range from about 20:1 down to about 1:1. Preferably, one should employ from about 2.5 to about 4 parts of water for every part of monomer present.

The polymerization temperature should be at least about 60° C. and below about 160° C. It is preferred, particularly for a continuous process, that the temperature range from about 100° C. to 120° C.

It should be abundantly clear that a wide variety of process parameters will influence the polymerization rate and the Mooney viscosity of the polymers obtained. As previously stated, the higher the polymerization temperature, the lower the Mooney viscosity. Moreover, increasing catalyst system concentration and increasing mole ratios of sodium iodide (up to the maximum mole ratio permitted) will tend to cause a reduction in Mooney viscosity. All these things being considered, one skilled in the art can vary a great many conditions to achieve the particular polymerization rate and Mooney viscosity desired.

The polymerization process should be operated at a pressure of at least about 400 p.s.i. While there is no true upper limit on pressure, it is preferred, particularly for a continuous process, that the pressure range from about 800 to about 1000 p.s.i.

The invention will now be described with reference to the following examples thereof wherein parts and percentages are by weight unless otherwise specified.

GENERAL POLYMERIZATION PROCEDURES

(A) Continuous

The following procedure is representative and illustrative of the general operating method for continuous polymerization:

Gaseous vinylidene fluoride and hexafluoropropylene are measured through Rotameters and then mixed in a pipe line. The mixed gases are compressed to approximately 900 lbs./sq. in. and led through a heated line to the reactor which is a "Type 316" stainless steel agitated autoclave with a free space volume of 1000 cc. The catalyst solutions are metered from separate reservoirs and mixed in a pipe line. The mixed catalyst solution is introduced into the autoclave through a separate line. The autoclave is operated liquid-full and is equipped with a take-off line in the lid. The normal operating temperature range is about 100° C. to 115° C. and the agitator is operated to give sufficient mixing to obtain a homogeneous emulsion. The overflow from the autoclave is passed through a pressure reducer which releases the polymerization mass at atmospheric pressure. The polymer is coagulated and the aqueous catalyst phase is discarded. The raw polymer is dried on a rubber mill heated to about 100° C. When the raw polymer is of exceptionally low Mooney viscosity (e.g., 10 to 30), it is advantageous to dry the polymer in a drier using radio-frequency radiation (e.g., a microwave drier). The latter affords rapid drying without serious degradation caused by high temperatures.

(B) Batch

The following procedure is representative and illustrative of the general operating method for batch polymerization:

The catalysts and 200 ml. of distilled water are charged into a 400 ml. "Type 316" stainless steel shaker bomb. The bomb is immersed in a −50° C. cooling bath, pressured to 10 p.s.i.g. with nitrogen, evacuated, and charged with 60 g. of hexafluoropropylene and 40 g. of vinylidene fluoride. The bomb is heated to 100° C. with shaking and held at 100° C. until the pressure drops. The polymer is coagulated, washed, and dried in a 60° C. vacuum oven.

EXAMPLES 1 TO 5

Using the continuous method described, five runs are made using the proportions of reactants shown in Table I. Typical results are given therein as indicated.

TABLE I

Monomer Feed Composition: vinylidene fluoride 59%; hexafluoropropylene 41%.
Monomer Feed Rate: 4.4 lb./hr.
Deionized Water Feed Rate: 6,000–6,300 ml./hr.
$(NH_4)_2S_2O_8$: 25 g./hr.
Pressure (p.s.i.g.): 900–950.
Temperature (° C.): 111–112.
NaBr or NaI as shown.

| | Example | | | | |
|---|---|---|---|---|---|
| | 1 | 2 | 3 | 4 | 5 |
| NaI (g./hr.) | 0.9 | 1.3 | 2.6 | 5.0 | |
| NaBr (g./hr.) | | | | | 2.5 |
| Mooney viscosity [1] (ML-10/212° F.) | 37 | 32 | 24 | 8 | 12 |
| Vinylidene fluoride, (percent) [2] | 56 | 57 | 56 | 59 | 58 |

[1] Determined on dried raw polymer per ASTM D-1646-63.
[2] Determined on dried raw polymer by infrared spectroscopic analysis.

If, for comparison, Example 4 is repeated using about 5 g./hr. of sodium bisulfite instead of the NaI, a polymer having a Mooney viscosity of about 63 (and 57% $VF_2$ content) is typically obtained.

To illustrate curing of polymers prepared and isolated as indicated above, the polymers of Examples 2, 4 and 5 are compounded as follows. For comparison, a Polymer X, not within the scope of this invention, is provided, typical of those prepared with $NaHSO_3$ as the reducing component and having a Mooney viscosity of about 65 and a $VF_2$ content of about 58%. Also for comparison, a Polymer Y, not within the scope of the invention, is provided which is typical of those prepared using high ratios of ammonium persulfate (e.g., 39 g./hr.) to sodium bisulfite (e.g., 5.2 g./hr.) the other conditions being substantially as in Example 1. The Mooney viscosity is typically about 28 and the $VF_2$ content about 57%.

About 100 parts of each polymer is compounded on a water-cooled rubber roll mill with 15 parts of magnesium oxide, 20 parts of MT Black, and 1.5 parts of hexamethylenediamine carbamate. The compounded stock is placed in a mold and cured in a press at 325° F. for 0.5 hour and then removed from the mold and placed in an oven for 18 hours at 400° F. to complete the cure. Typical results appear in Table II below.

TABLE II.—ORIGINAL PROPERTIES

| | Example | | | | |
|---|---|---|---|---|---|
| | 2 | 4 | 5 | X[1] | Y[1] |
| Tensile at break, p.s.i. | 2,400 | 2,550 | 2,300 | 2,770 | 2,530 |
| Elongation at break, percent | 210 | 160 | 140 | 190 | 220 |
| Modulus at 100% elong., p.s.i. | 650 | 1,000 | 1,000 | 1,000 | 640 |
| Hardness | 72 | 77 | 78 | 76 | 74 |
| Mooney Scorch [2] | 8 | 10 | 5 | 10 | 13 |
| Compression Set [3] | 18 | 14 | 18 | 14 | 27 |
| Mooney visc. of uncured polymer (ML-10/212° F.) | 32 | 8 | 12 | 65 | 28 |

Properties after 3 days at 500° F.

| | Example | | | | |
|---|---|---|---|---|---|
| | 2 | 4 | 5 | X[1] | Y[1] |
| Tensile at break, p.s.i. | 2,300 | 2,130 | 2,000 | 2,400 | 2,200 |
| Elongation at break, percent | 210 | 140 | 160 | 160 | 200 |
| Modulus at 100% elong., p.s.i. | 850 | 1,550 | 1,200 | 1,500 | 1,000 |
| Hardness | 72 | 85 | 83 | 84 | 80 |

[1] Outside the invention; for comparison only.
[2] Minutes from the minimum to a 5 point rise at 250° F. ASTM D-1646-63.
[3] Method B of ASTM D-395-61; 70 hrs. at 250° F.

The above data illustrate that the polymers prepared according to this invention, e.g., Example 4, with a Mooney viscosity of only 8 in the uncured state, will cure to a vulcanizate that resists heat-aging and exhibits properties comparable to the high Mooney Polymer X. The low Mooney polymers of this invention are easily processed.

The above data further illustrate that Polymer Y, a sodium bisulfite catalyzed polymer whose Mooney viscosity is comparable to the polymer of Example 2, exhibits an objectionably higher compression set and after heat-aging shows a greater loss of tensile strength and increase in hardness and modulus. Thus, the polymer of Example 2 is seen to resist heat aging better than a comparably low Mooney bisulfite catalyzed polymer.

EXAMPLES 6 TO 9

The same conditions are used for Examples 6 to 9 as those described above in Table I except that the $(NH_4)_2S_2O_8$ is fed at 14 g./hr., the NaI at 1.8 g./hr. in each case, and the polymerization temperature is varied as shown in Table III. The data illustrate the effect of temperature, all other conditions being constant.

TABLE III

| | Example | | | |
|---|---|---|---|---|
| | 6 | 7 | 8 | 9 |
| Temperature (° C.) | 100–102 | 106–108 | 111–112 | 115 |
| Mooney viscosity (ML–10/212° F.) | 86 | 62 | 55 | 44 |
| Vinylidene fluoride (percent) | 65 | 62 | 59 | 58 |

EXAMPLES 10 TO 17

Using the Batch Method previously described, eight runs are made using the proportions of reactants shown in Table IV.

If, for comparison, a run is made using 0.2 g. of $NaHSO_3$ instead of the 0.172 g. of iodine in Example 13, the inherent viscosity is about 0.60 and the $VF_2$ content about 54%. In these examples, the inherent viscosity values show the same effect of using the invention as Mooney viscosity. The lower the inherent viscosity, the more easily the polymer is processed. To employ NaOBr in the above examples, one should employ comparable solution weights and concentrations as the NaOCl solution employed in Examples 16 and 17.

TABLE IV $(NH_4)_2S_2O_8$: 1.0 g.
Halogen: As shown.
Distilled Water: 200 ml.
Vinylidene fluoride: 40 g.
Hexafluoropropylene: 60 g.
Temperature: 100° C.
Pressure: Autogenous.

| | Example | | | | | | | |
|---|---|---|---|---|---|---|---|---|
| | 10 | 11 | 12 | 13 | 14 | 15 | 16 | 17 |
| Iodine (g.) | 0.023 | 0.047 | 0.090 | 0.172 | | | | |
| Bromine (g.) | | | | | 0.11 | | | |
| Chlorine (g.) | | | | | | 0.05 | | |
| NaOCl solution (g.) [1] | | | | | | | 0.142 | 0.994 |
| Inherent viscosity [2] | 0.45 | 0.39 | 0.32 | 0.26 | 0.38 | 0.41 | 0.48 | 0.28 |
| Vinylidene fluoride, percent [3] | 54 | 52 | 54 | 52 | 54 | 52 | 51.5 | 54.2 |

[1] Reagent grade sodium hypochlorite solution containing 5% minimum "available Cl" available from Baker & Adamson Co.
[2] Determined at 30° C. on dried raw polymer as a 0.1% solution in tetrahydrofuran/dimethylformamide (87/13% by vol.).
[3] Determined in dried raw polymer by infrared spectroscopic analysis.

EXAMPLES 18 to 20

Using a continuous method similar to the one described, four runs are made using the proportion of reactants shown in Table V. Typical results are given therein as indicated. The units g./gal.-hr. or lb./gal.-hr. refer to the weight used in one hour's time per each gallon of reactor volume.

TABLE V

Monomer feed composition: Vinylidene fluoride 62%; hexafluoropropylene 19%; tetrafluoroethylene 19%.
Monomer feed rate: 8.1 lb./gal., hr.
Deionized water feed rate: 37 lb./gal., hr.
Pressure (p.s.i.g.): 900–950.
Temp. $(NH_4)_2S_2O_8$, NaI, $NaHSO_3$ as shown.

| | Example | | | |
|---|---|---|---|---|
| | 18 | 19 | 20 | Z [1] |
| $(NH_4)_2S_2O_8$ (g./gal.-hr.) | 33 | 33 | 33 | 45 |
| NaI (g./gal.-hr.) | 0.8 | 2.2 | 5.5 | 0 |
| $NaHSO_3$ (g./gal.-hr.) | 0 | 0 | 0 | 9 |
| Temperature (° C.) | 107 | 107 | 109 | 107 |
| Vinylidene fluoride (percent) [2] | 40 | 43 | 43 | 44 |
| Hexafluoropropylene (percent) [2] | 33 | 31 | 32 | 28 |
| Tetrafluoroethylene (percent) [2] | 27 | 26 | 25 | 28 |
| Mooney viscosity (ML–10/212° F.) [3] | 72 | 53 | 33 | 127 |

[1] Outside the invention; for comparison only.
[2] Determined on dried raw polymer by nuclear magnetic resonance.
[3] Determined on dried raw polymer per ASTM D-1646-63.

Although the Mooney viscosity of Example 18 is 72, it is quite low in comparison to Polymer Z which exhibits a Mooney viscosity of 127 despite an even higher amount of persulfate.

About 100 parts of each polymer is compounded on a water-cooled rubber mill with 15 parts of magnesium oxide, 25 parts of MT Black, 4 parts of N,N'-dicinnamylidine-1,6-hexanediamine. The compounded stock is placed in a mold and cured in a press at 300° F. for 0.5 hour and then removed from the mold and placed in an oven for 24 hours at 400° F. to complete the cure. Typical results appear in Table VI below.

TABLE VI

| | Original Properties | | | |
|---|---|---|---|---|
| | Example | | | |
| | 18 | 19 | 20 | Z |
| Tensile at break, p.s.i. | 2,500 | 2,300 | 2,100 | 2,580 |
| Elongation at break, percent | 245 | 200 | 195 | 240 |
| Modulus at 100% elong., p.si. | 825 | 870 | 800 | 920 |
| Hardness | 78 | 78 | 78 | 79 |
| Mooney scorch [2] | 29 | 29 | 31 | 24 |
| Compression set [3] | 27 | 28 | 25 | 24 |

| | Properties after 3 days at 550° F. | | | |
|---|---|---|---|---|
| | Example | | | |
| | 18 | 19 | 20 | Z [1] |
| Tensile at break, p.s.i. | 1,460 | 1,500 | 1,350 | 1,400 |
| Elongation at break, percent | 160 | 125 | 100 | 140 |
| Modulus at 100% elong., p.s.i. | 1,080 | 1,200 | 1,350 | 1,000 |
| Hardness | 86 | 84 | 84 | 84 |

[1] Outside the invention; for comparison only.
[2] Minutes from the minimum to a 5-point rise at 250° F. ASTM D-1646-63.
[3] Method B of ASTM D-395-61; 70 hrs. at 250° F.

To apply the teachings of this invention as illustrated in the above examples to the preparation of other vinylidene fluoride interpolymers such as $VF_2$/trifluorochloroethylene copolymers, $VF_2$/perfluoro(alkyl vinyl)ether copolymers and other polymers of $VF_2$, one skilled in the art should modify the known redox polymerization procedures for such polymers as set forth in the patents referred to herein by employing the water-soluble iodide, bromide, hypochlorite or hypobromite, or iodine, bromine or chlorine, for the reducing component of the oxidation-reduction catalyst system. Naturally, process conditions, such as feed rate, temperature, pressure, catalyst concentration, and ratio of reactants can be varied as indicated herein and as indicated in the prior art as is well known to those skilled in the art.

It is regarded as being within the scope of this invention to employ, instead of the water-soluble iodide or bromide or free halogens, a water-soluble compound containing chlorine, bromine or iodine, which compound is capable of being converted by the peroxy component to liberate in situ the corresponding free halogen.

The polymers made according to this invention are useful for a wide variety of applications such as caulks, plasticizers or processing aids for conventional fluorocarbon elastomer, or as general-purpose, easy-processing rubbers suitable for injection or transfer molding. Moreover, since by using this invention polymers of Mooney viscosities (ML–10/212° F.) below 50 and even as low as about 7 can be produced, they can be processed and fabricated much more easily than high Mooney polymers of corresponding composition. Even at such low viscosities, the polymers exhibit little tendency to stick to processing equipment.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

I claim:

1. In a process for the preparation of vinylidene fluoride interpolymers by polymerization in an aqueous medium using an oxidation-reduction catalyst system wherein the oxidation component is one or more water-soluble peroxy catalyst compounds capable of initiating polymerization of the monomers in the system, the improvement wherein the reducing component consists essentially of a water-soluble iodide, bromide, hypochlorite or hypobromite, or an aqueous solution of iodine, bromine or chlorine, or mixtures thereof, and the mole ratio of the oxidation component to the reducing component ranges from 70:1 to 1.2:1.

2. A process as defined in claim 1 wherein said interpolymer is a polymer of vinylidene fluoride with at least one comonomer selected from the group consisting of hexafluoropropene, tetrafluoroethylene and trifluorochloroethylene.

3. A process as defined in claim 1 wherein said component (b) is sodium iodide, sodium bromide or sodium hypochlorite and component (a) is ammonium persulfate.

4. A continuous process for the preparation of vinylidene fluoride/hexafluoropropene or vinylidene fluoride/hexafluoropropene/tetrafluoroethylene interpolymers of Mooney viscosities (ML–10/212° F.) below about 50 which comprises polymerizing the above-identified monomers in from 20 parts to 1 part of water per part of monomers at a temperature between about 60° C. to 160° C. and a pressure of at least 400 p.s.i. in the presence of at least one part of a catalyst system per 150 parts of monomers, which system consists of (a) one or more water-soluble peroxy catalyst compounds capable of initiating polymerization of monomers in the system, and (b) a water-soluble iodide, bromide, hypochlorite or hypobromite, or aqueous solution of iodine, bromine or chlorine, or mixtures thereof, the mole ratio of (a) to (b) ranging from 70:1 to 1.2:1.

5. A continuous process for the preparation of vinylidene fluoride/hexafluoropropene or vinylidene fluoride/hexafluoropropene/tetrafluoroethylene interpolymers of Mooney viscosities below about 50 which comprises polymerizing the above-identified monomers in 2.5 to 4 parts of water per part of monomer at a temperature between about 100° C. to 120° C. and a pressure between about 800 and 1000 p.s.i. in the presence of at least one part of a catalyst system per 150 parts of monomers, which system consists of (a) one or more water-soluble peroxy catalyst compounds capable of initiating polymerization of monomers in the system, and (b) sodium iodide, sodium bromide or sodium hypochlorite, the mole ratio of (a) to (b) ranging from 3:1 to 20:1.

References Cited

UNITED STATES PATENTS

| | | | |
|---|---|---|---|
| 2,689,241 | 9/1954 | Dittman et al. | 260—87.5 |
| 2,774,751 | 12/1956 | Passino et al. | 260—87.5 |
| 3,053,818 | 9/1962 | Honn et al. | 260—80.5 |

OTHER REFERENCES

Rubber Age, November 1966, pp. 86–89.

JOSEPH L. SCHOFER, Primary Examiner

STANFORD M. LEVIN, Assistant Examiner

U.S. Cl. X.R.

260—41, 87.7